Jan. 5, 1926.

C. B. HOWARD

VEHICLE WHEEL

Filed August 23, 1921

1,568,456

INVENTOR:
C. B. HOWARD
BY Joseph B. Gardner
his ATTORNEY

Patented Jan. 5, 1926.

1,568,456

UNITED STATES PATENT OFFICE.

CLARENCE B. HOWARD, OF OAKLAND, CALIFORNIA.

VEHICLE WHEEL.

Application filed August 23, 1921. Serial No. 494,662.

*To all whom it may concern:*

Be it known that I, CLARENCE B. HOWARD, a citizen of the United States, and a resident of Oakland, county of Alameda, and State of California, have invented a new and useful Vehicle Wheel, of which the following is a specification.

My invention relates to a vehicle-wheel and particularly to the disc type of automobile wheels.

An object of the invention is to provide a steel disc wheel of extremely light and inexpensive construction but which at the same time possesses the strength and rigidity of the heavier types of disc wheel.

Another object of the invention is to provide a wheel of the disc type which may be demounted by merely unscrewing the hub cap.

A further object is to provide a disc wheel in which the usual buckling occasioned by the unequal expansion of the body and rim due to their different thickness, is eliminated.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings.

Briefly expressed the wheel as here shown comprises a pair of steel discs between which is disposed a filler of paper or the like. The discs and filler are bolted together and are perforated to fit over a hub element, the perforation and element being of such shape as to fix the discs and filler for rotative movement with said element. Other means in addition to the last mentioned are provided for removably holding the discs and filler locked on the hub element. Means are also included for releasably retaining the discs and filler structure in proper position on the element. Tire clamping means of a nature to eliminate the usual buckling of the discs, are further included.

Figure 2:
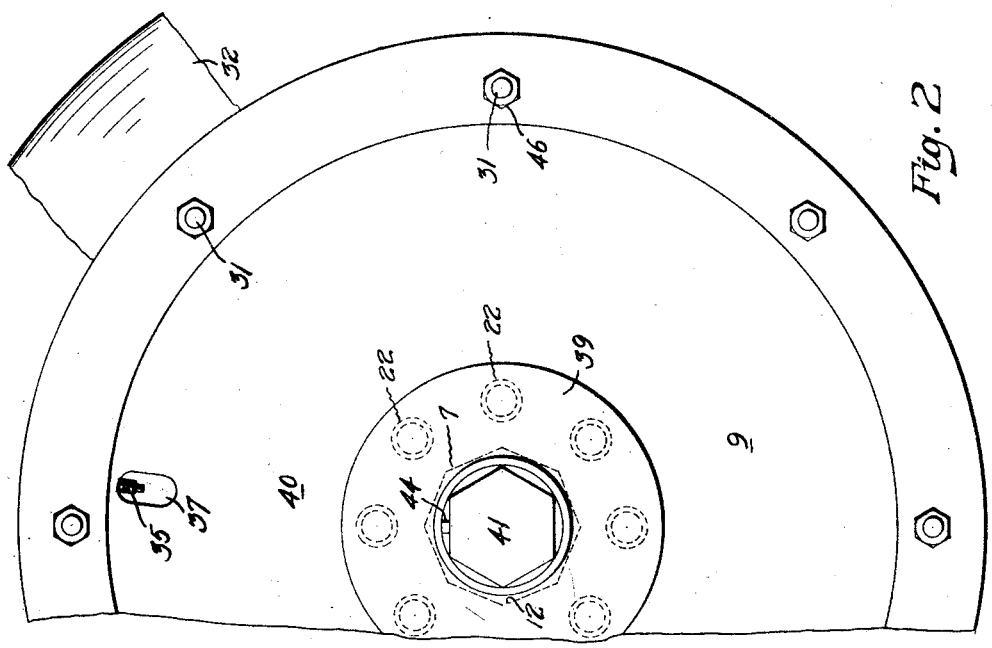
Figure 2 is a side elevation of a portion of the wheel.
Figure 1:
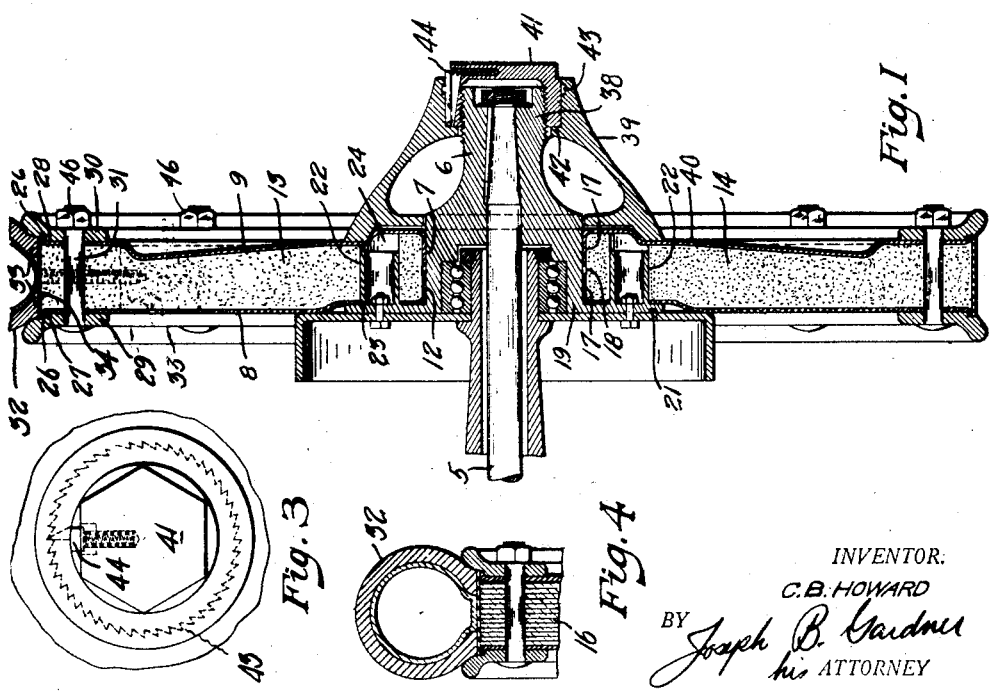
Figure 1 is a vertical section taken through the wheel.
Figure 3:
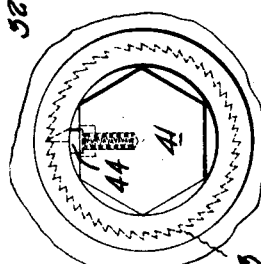
Figure 3 is an enlarged side view of the hub portion.
Figure 4:
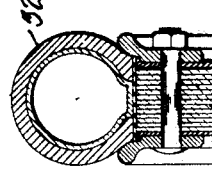
Figure 4 is a sectional view of a portion of the wheel showing a slight modification.

A detailed description follows:

The structure shown in the drawings comprises an axle 5 to which is keyed an inner hub element 6 a portion 7 of which is preferably of polygonal or similar section. The body of the wheel comprises inner and outer discs 8 and 9 preferably formed of steel and provided with a central opening 12 practically corresponding in size and shape to the polygonal portion 7 of the hub element. The discs are disposed in spaced relation and a filler 13 of paper, either in the form of compressed pulp 14 or laminated paper sheets 16 as shown in Figure 4, is preferably interposed between them.

Due to the filler the discs may be made of very thin steel stock and still insure the body structure with the necessary strength and rigidity, and since the paper is of such comparatively light weight, the body it will be seen is extremely light. The center of the filler is perforated similar to the discs, and the edges 17 of the latter adjacent the perforation 12 are bent toward each other, thereby providing the discs with a large abutting surface against the hub element, and at the same time protecting the walls 18 of the perforated portion of the filler. It will be clear that on account of the shape of the hub element and the perforations of the discs and filler, that each of the latter will separately cooperate with the hub element to prevent rotation of the wheel body when it is positioned thereon. Additional means for fixing the wheel body on the hub element for rotation therewith, are also provided. As here shown the inner end 19 of the element is formed with a thrust plate 21 against which the body is held when engaged on the element. Extending outwardly from the plate are a plurality of studs 22 which are arranged to removably engage in openings 23 and 24 formed in the disc 8 and filler 13 respectively. In this manner when the wheel is functioning as a driving member the turning effort of the axle and hub element will be effectively and evenly transmitted to the wheel body.

The outer edges 26 of the discs are bent away from each other and are supported upon shoulders 27 and 28 formed in the annular rim members or tire retaining clamps 29 and 30 disposed on the exposed sides of the discs. By thus forming the rim members or clamps separate of discs, the former may be increased in thickness, without rendering the discs subject to the buckling usually brought about by the unequal expansion of the rim and disc when formed integral with each other and of different thicknesses. The rims are secured to the wheel body by means of bolts 31 which also function to hold discs and filler together. The tire 32 is arranged to be held in the usual manner between the rim members, and the edges 33 thereof are adapted to engage the discs and filler. Since the bent edges 26 of the discs form a large supporting surface for the edges 33 of the tire, and are supported on the rims, the load pressure is transmitted to the rims and discs rather than to the filler, thereby relieving the latter of any undue strain. It will also be noted that on account of the bent edges 17 adjacent the center of the discs, the load may be effectively transmitted from the discs to the hub element.

In order to prevent the usual oxidizing of the inner face of the ends of the tire, that is produced by contact with the metal of the adjacent parts, I preferably interpose a non-metallic pad 34 between said ends and the edges of the disc and filler. The pad and filler are preferably provided with suitable openings for the reception of the valve stem 35 of the inner tube of the tire, and an aperture 37 is formed in the inner disc 8 to permit the necessary access to the stem.

Means are provided for retaining the wheel in proper position on the hub element, and at the same time enabling of the rapid demounting of the wheel when necessary. Surrounding the outer end 38 of the hub element 6 is an outer hub element 39 which is arranged to engage the exposed side 40 of the disc 9. The outer element is removably held against the disc by means of a hub cap 41 which has a threaded engagement with the end 38 of the inner hub and is adapted to press against the internal shoulder 42 of the outer hub element. The inner face of the outer element is also provided with circumferentially disposed ratchet teeth 43 which when engaged by the spring pressed pawl 44 pivoted to the cap, prevent the rotation of the latter in the direction to effect the withdrawal thereof.

In operation to remove the wheel, a suitable wrench is applied to the cap, the pawl 44 being held between the jaws of the wrench so as to hold it disengaged from the teeth 43. As soon as the cap is removed the outer element and the wheel are entirely free to be slipped off the inner hub. To replace the wheel the latter is slipped back over the inner hub, and the central perforation of the wheel fitted upon the polygonal portion of the hub, the perforations 23 and 24 being at the same time engaged by the studs 22. The outer hub element may then be replaced, and the hub cap screwed into position.

Should it be desired to replace a tire without removing the wheel, it is merely necessary to remove the nuts 46 from the bolts 31 and then remove the rim member.

I claim:

1. A tired vehicle wheel comprising inner and outer discs, a filler of paper interposed therebetween, tire retaining means removably carried adjacent the peripheral portions of said discs, and means for securing said discs and said filler together.

2. A vehicle-wheel comprising inner and outer discs having perforations for engagement with an inner hub element, a filler of lighter material than said discs arranged therebetween, means for securing said discs to each other and said filler, and an outer hub element adapted to releasably engage said first element and said outer disc whereby said discs and filler may be removably retained on said first element.

3. A vehicle-wheel comprising inner and outer discs having a central polygonal perforation for engagement with a hub element of similar polygonal cross-section, a filler of lighter material than said discs adapted to be interposed between them and provided with a corresponding aligned perforation whereby said filler may be held against rotation with respect to said hub element irrespective of said discs, means for securing said discs to each other and said filler, and a second hub element adapted to releasably retain said discs and filler in proper position on said first element.

4. A vehicle-wheel comprising inner and outer discs having a central perforation adapted to engage a hub element, a filler of lighter material than said discs adapted to be interposed therebetween, means for securing said discs to each other and said filler whereby a unitary structure may be had, and means on said discs and filler adapted to separately cooperate with said hub element to prevent rotation of said structure with respect to said element.

5. A vehicle-wheel comprising inner and outer discs, a filler of lighter material than said discs interposed therebetween, annular tire retaining members disposed on the exposed side of the rim portions of said discs, and means for securing said discs said filler and said retaining members together.

6. A vehicle-wheel comprising an inner hub element, a perforated disc structure removably mounted for rotation with said element, a member provided on the inner end of said element, a plurality of outwardly extending studs on said member adapted to removably engage in the perforations of said disc structure, and an outer hub element adapted to engage said structure so as to prevent the disengagement of said studs and perforations.

7. A vehicle-wheel comprising a hub element, a thrust member provided at the inner end thereof, inner and outer discs arranged on said element, a filler of lighter material than said discs arranged therebetween, said inner disc and filler being provided with aligned perforations, and a plurality of studs adapted to seat in said perforations and terminating inwardly of said outer disc.

8. A vehicle-wheel comprising an inner hub element of polygonal cross-section, inner and outer discs having corresponding polygonal perforations for engagement with said hub element, a paper filler interposed between said discs and having a similar perforation, a thrust member formed on the inner end of said element, a plurality of studs on said member, said inner disc and filler being provided with perforations for engagement with said studs, an outer hub element engaging the exposed side of said outer discs, and a hub cap removably engaging said first hub element adapted to retain said second hub element in engagement with said outer disc.

9. A vehicle-wheel comprising inner and outer discs having a central aperture for engagement with a hub element, a filler of a lighter material than said discs arranged therebetween and provided with a corresponding aligned aperture, and a flange on one of said discs adapted to fit against the inner side wall of the filler.

In witness whereof, I have hereunto set my hand at Oakland, California, this 12th day of August, 1921.

CLARENCE B. HOWARD.